United States Patent [19]

Katto

[11] Patent Number: 4,525,660
[45] Date of Patent: Jun. 25, 1985

[54] CONTROL APPARATUS FOR INVERTER

[75] Inventor: Masayuki Katto, Aichi, Japan

[73] Assignee: Mitsubishi Denki Kabushiki Kaisha, Tokyo, Japan

[21] Appl. No.: 580,048

[22] Filed: Feb. 14, 1984

[30] Foreign Application Priority Data

Feb. 17, 1983 [JP] Japan .................................. 58-27136

[51] Int. Cl.³ .............................................. H02P 5/40
[52] U.S. Cl. .................................... 318/798; 318/805; 318/807
[58] Field of Search ....................... 318/807, 805, 798; 363/56–58

[56] References Cited

U.S. PATENT DOCUMENTS

| 3,500,158 | 3/1970 | Landau et al. | 318/805 |
| 3,593,103 | 7/1971 | Chandler et al. | 318/808 |
| 3,671,831 | 6/1972 | Chausse et al. | 318/800 |
| 3,983,463 | 9/1976 | Nabae et al. | 318/803 |
| 4,139,885 | 2/1979 | Overzet et al. | 363/58 |
| 4,315,203 | 2/1982 | Ibamoto et al. | 318/807 |

Primary Examiner—David Smith, Jr.
Attorney, Agent, or Firm—Sughrue, Mion, Zinn, Macpeak & Seas

[57] ABSTRACT

An inverter control apparatus comprises a first current level setting unit 5 which sets a protection level for switching elements included in an inverter 1, and a second current level setting unit 7 which sets a current level that prevents a stall torque/slip point from being exceeded and which is determined in association with the load characteristic of an induction motor and the voltage/frequency ratio being delivered by the inverter. The smaller of the two current levels is selected to control the frequency to lower or stop its rise to prevent the slip frequency from being exceeded. Thus, stable operation without stalling or damage to the inverter elements is achieved regardless of the voltage/frequency ratio set to drive the motor or the particular induction motor used.

7 Claims, 10 Drawing Figures (A)

(B)

(C)

CONTROL APPARATUS FOR INVERTER

BACKGROUND OF THE INVENTION

The present invention relates to a control apparatus for a voltage-controlled inverter which subjects an A.C. power source to variable-frequency and variable-voltage conversion to drive an induction motor at a variable speed.

Referring to the prior art apparatus shown in FIG. 1, numeral 1 designates the main inverter circuitry which subjects an A.C. power source to variable-voltage and variable-frequency conversion to drive an induction motor 2 at a variable speed. Drive circuitry 3 drives controllable elements within the main inverter circuitry. A current detector 4 detects the inverter output current. A first current level setting unit 5 sets a level for protecting the elements of the main inverter circuitry from overcurrents. Numeral 6 designates control circuitry which receives the set signal of the unit 5 and the current detection value of the detector 4, and which prepares a variable-frequency and variable-voltage control signal on the basis of a velocity command while monitoring that the inverter output current does not exceed the level set by the unit 5.

A conventional variable-frequency and variable-voltage control method employing the inverter apparatus of FIG. 1 and the relationships between the slip S of the induction motor 2 and the torque T and current I thereof will be described with reference to FIGS. 3(A) and 4(A). In general, in performing the variable-frequency and variable-voltage control, the voltage V/frequency F ratio-constant control method is employed in which, as illustrated in FIG. 3(A), the magnetic flux is held constant irrespective of the frequency so as to maintain the generated torque at a constant magnitude (in a lower frequency region, however, the voltage is set at a somewhat greater value in order to compensate the drop component ascribable to resistance). The frequency at this time is denoted by $F_1$ and the voltage by $V_1$, and the relationships of the slip S to the generated torque T and current I are illustrated in FIG. 4(A). The main circuit elements of the inverter apparatus are selected and determined to permit to flow therethrough enough current to generate the rated torque of the induction machine having the same capacity as that of the inverter. A current $I_o$, which is set for protecting the elements, exists in a region less than a slip value $S_{m1}$ at which a stall torque $T_{m1}$ is generated. Usually, if the current is within the level $I_o$, the motor will be stably operable without exceeding the slip value $S_{m1}$.

The operation of the apparatus in FIG. 1 will be described with reference to FIG. 2–FIG. 4(B). As shown by way of example in FIG. 2, the main inverter circuitry 1 consists of a three-phase full-wave diode converter portion 11 which converts A.C. supply voltages into D.C., a smoothing capacitor which smooths the D.C. voltages, and a three-phase inverter portion 12 which is composed of transistors and diodes and which subjects the D.C. voltages to variable-frequency and variable-voltage conversion. A permissible current level is set by the first current level setting unit 5 in order to protect the semiconductor elements of the inverter portion 12 from overcurrents.

Upon receiving the velocity command, the control circuitry 6 determines on-off signals for the transistors of the inverter portion 12 on the basis of the received command in order to deliver a voltage and a frequency corresponding to the velocity command in accordance with a predetermined voltage/frequency ratio pattern. In consequence, the inverter performs the variable-voltage and variable-frequency conversion operation in response to the signal of the drive circuitry 3, and the induction motor 2 rotates at a speed at which the motor output torque determined from the present output voltage/frequency balances the load torque. At this time, the inverter output current determined from the output voltage/frequency and the rotating speed flows, and this current is detected by the current detector 4 and applied to the control circuitry 6. If the current detection signal is smaller than the first current level setting signal set by the level setting unit 5, the operation will be continued without any change. Ordinarily, the first current level setting value is greater than the required current at the rated torque of the induction motor corresponding to the inverter capacity, and the operation can be normally continued at or near the rated load.

In contrast, if the load torque is too great or the slip increases due to a rapid acceleration, the inverter output current will increase. If, at this time, the detected current value is greater than the first current level setting value, the inverter elements might be damaged. The increase of the slip is therefore suppressed by lowering the frequency or stopping its increase, to thus control the induction motor to operate at or below the first current level setting value. If, even with this measure, the output current remains above the first current level setting value without decreasing, the transistors will be turned "off" to stop the inverter and protect the elements.

With the conventional inverter controller operating as described above, with just a single current level being set to protect the elements, if the capacity of the induction motor is smaller than the inverter capacity, or the output voltage/frequency ratio is small in conformity with the load as illustrated in FIG. 3(B), or the output voltage/frequency ratio is small above a rated frequency for a constant output operation as illustrated in FIG. 3(C), then the first current setting level $I_o$ will exist at a point greater than a slip value $S_{m2}$ generating a stall torque $T_{m2}$ as illustrated in FIG. 4(B). In this case, even when the load has increased, the motor continues to operate with the voltage/frequency ratio remaining unchanged, until the current reaches $I_o$. This has led to the disadvantage that the motor stalls due to its operation entering a slip region greater than the slip value $S_{m2}$.

SUMMARY OF THE INVENTION

The present invention has been made in order to eliminate the disadvantage of the conventional apparatus described above, and has for its object to provide an inverter control apparatus in which, besides a unit for setting a first current level, a unit for setting a second current level determined from a frequency/voltage ratio in a present operation or the characteristic of a load induction motor is included, and wherein the main inverter circuitry is controlled by comparing the smallest one of the current level setting signals with the detected output current of the inverter, whereby the motor can operate in a stable region where it does not stall under any driving conditions simultaneously with attaining the protection of the inverter elements.

DETAILED DESCRIPTION OF THE PREFERRED EMBODIMENT

Figure 1:
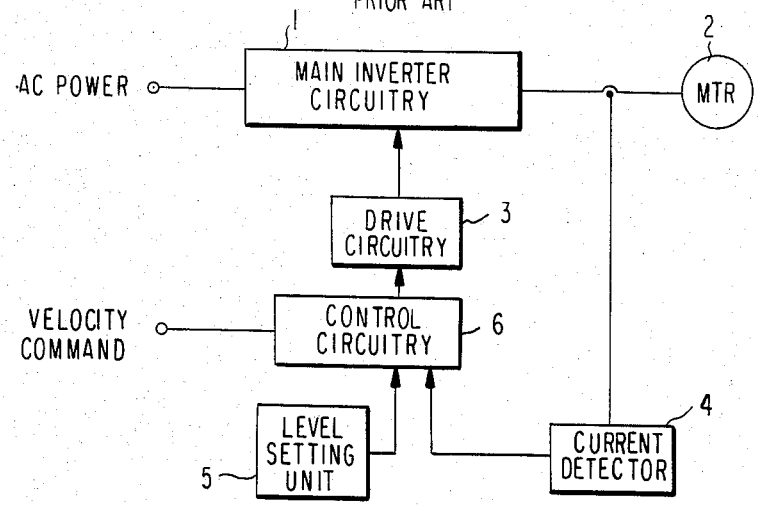
FIG. 1 is a block diagram showing a prior art inverter control apparatus.
Figure 5:
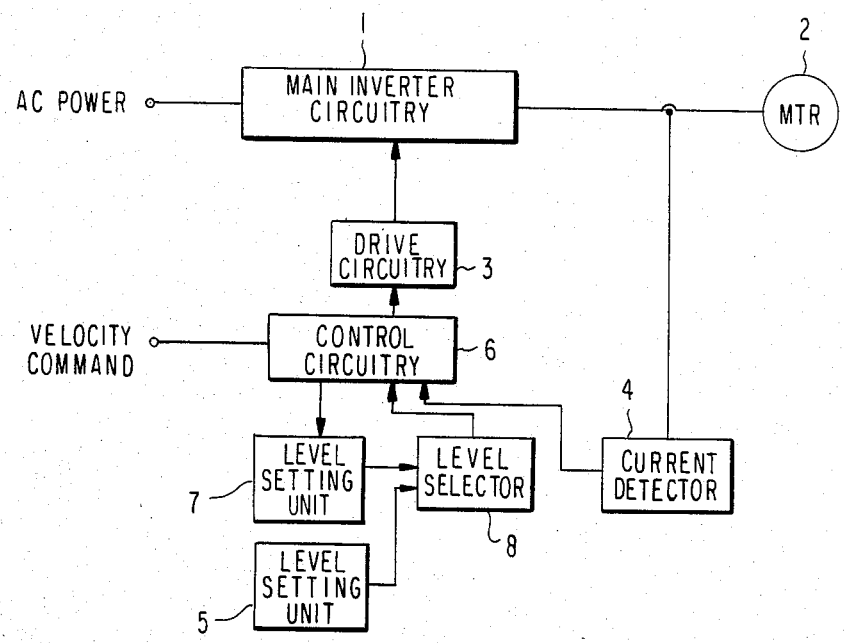
FIG. 5 is a block diagram showing an embodiment of the present invention.

An embodiment of the present invention will now be described with reference to FIG. 5 in which the same parts as in FIG. 1 are assigned the same numerals. In FIG. 5, numeral 7 designates a second current level setting unit which sets a current level to flow at the slip frequency $S_m$ generating the stall torque, in accordance with the load characteristic of the induction motor and the voltage/frequency ratio in the present operation. Numeral 8 designates a current level selector which selects the smallest one of the set outputs of the second current level setting unit 7 and the first current level setting unit 5. While comparing and observing the output of the current detector 4 and the current level selected by the level selector 8, the control circuitry 6 prepares the on-off signals for the switching elements of the inverter and controls the inverter in accordance with the voltage/frequency ratio to operate the inverter on the basis of the velocity command.

With the arrangement of FIG. 5, the permissible current level $I_o$ is set in the first current level setting unit 5 to protect the transistors or diodes of the inverter portion 1 from overcurrents, while the current level $I_m$ to flow at the slip frequency generating the stall torque is set in the second current level setting unit 7 in association with the drive characteristics of the induction motor being presently driven and the voltage/frequency ratio being presently delivered by the inverter. On the basis of the velocity command, the control circuitry 6 determines the on-off signals for the transistors of the inverter portion 12 and subjects the inverter to the variable-voltage and variable-frequency operation through the drive circuitry 3 to provide a voltage and a frequency corresponding to the velocity command in accordance with a predetermined voltage/frequency ratio pattern. In this way, the induction motor 2 is controlled to rotate at a speed at which the output torque and the load torque balance. The inverter output current is thus determined by the induction machine characteristic, the voltage/frequency ratio and the rotational speed.

Figure 4:
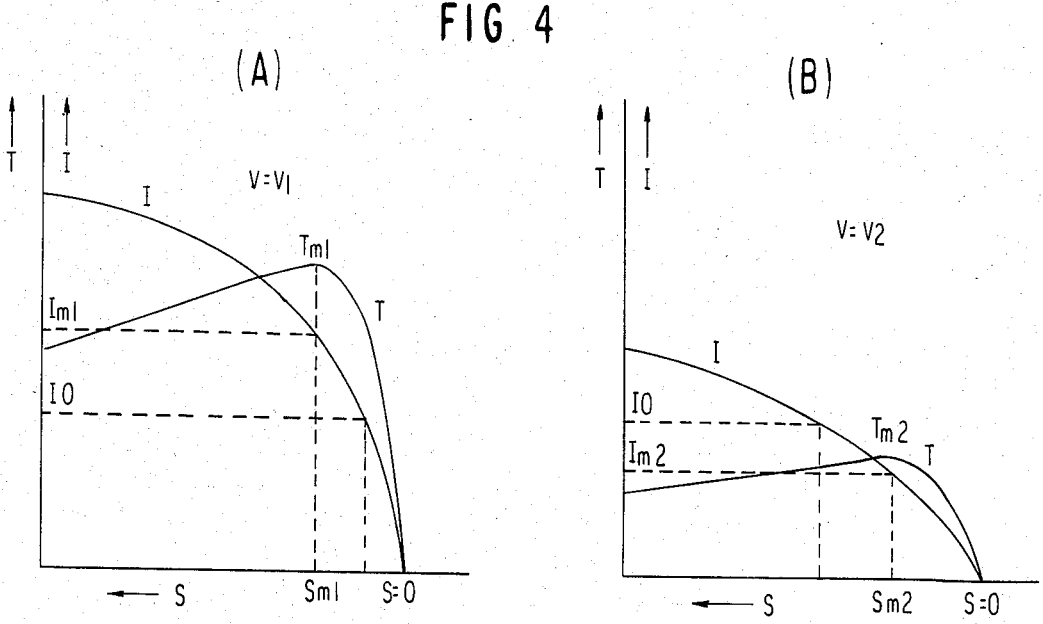
FIGS. 4(A) and 4(B) are characteristic diagrams depicting the relationships of torques, currents and slips.

The drive condition illustrated in FIG. 4(A) will now be considered. Since the set value $I_o$ of the first current level setting unit 5 is smaller than the set value $I_{m1}$ of the second current level setting unit 7, the first current level setting value $I_o$ is delivered from the current level selector 8. Accordingly, even when the current has increased due to an augmented slip attributed to an increased load, rapid acceleration or the like, when it approaches the $I_o$ level the control circuitry 6 controls the inverter to decrease the frequency or to stop its increase in accordance with the predetermined voltage/frequency ratio pattern to reduce the slip. Thus, the motor is permitted to operate without stalling beyond the slip $S_{m1}$ corresponding to the stall torque $T_{m1}$ and without exceeding the permissible current level of the semiconductor elements.

On the other hand, in a case where, as illustrated in FIG. 4(B), the motor capacity is smaller than the inverter capacity or the voltage/frequency ratio is reduced to perform an underexcitation operation, the first current level setting value $I_o$ might become greater than the second current level setting value $I_{m2}$. At this time, the set value $I_{m2}$ is delivered from the current level selector 8. Accordingly, when the current has increased due to an augmented slip attributed to the rise of the load, rapid acceleration or the like and approaches the $I_{m2}$ level, the frequency is decreased or its increase stopped in accordance with the predetermined voltage/frequency pattern, to suppress the increase of the slip. The motor can therefore be operated without stalling beyond the slip of the stall torque point $T_{m2}$ and within the permissible current level of the semiconductor elements. Needless to say, it is one aspect of the control means of the present invention to further turn "off" the drive signals of controllable elements constituting the inverter to prevent any damage to the inverter and other systems.

Figure 6:
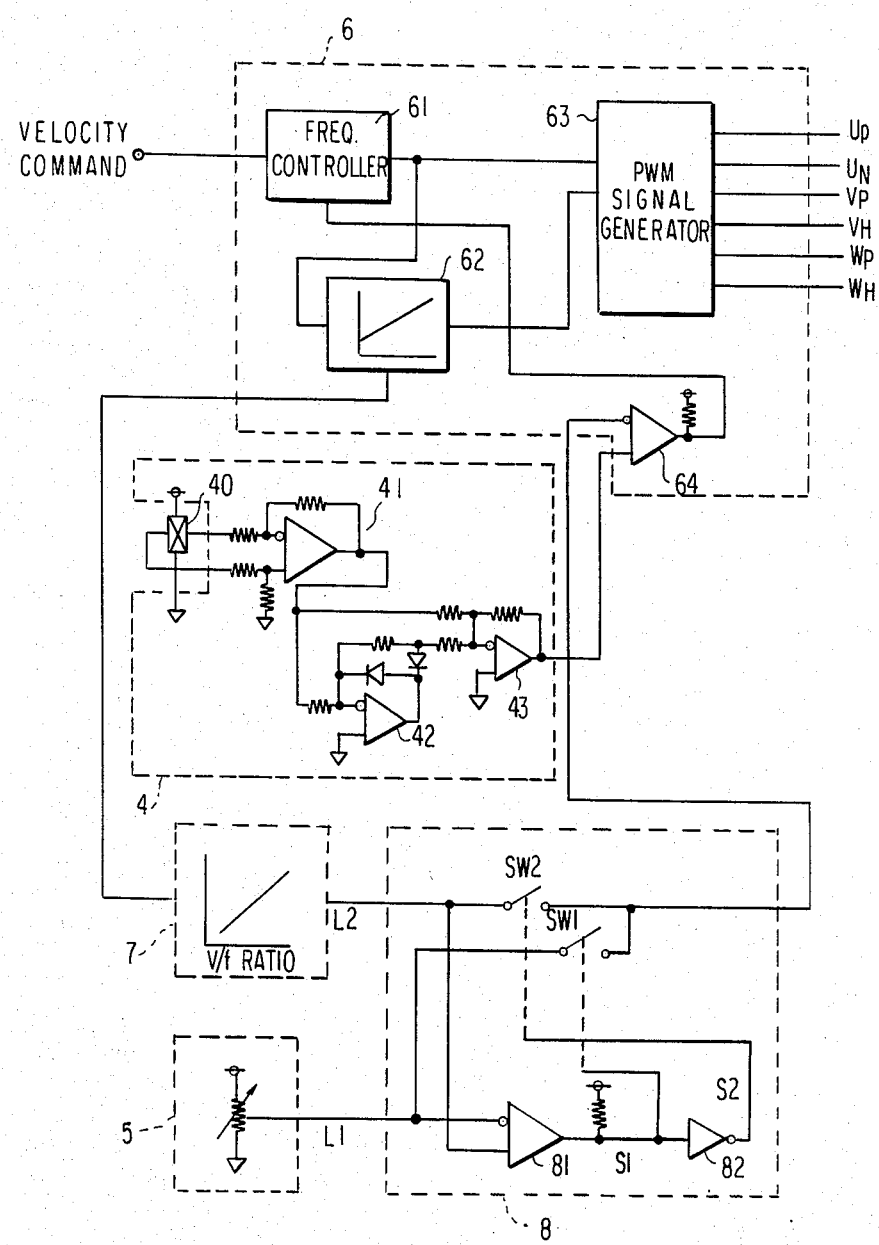
FIG. 6 is a circuit diagram showing the control apparatus according to the present invention.

FIG. 6 illustrates the details of the control apparatus shown in FIG. 5, wherein the current detector 4 is shown as employing a magnetosensitive device. A signal proportional to the output current of the main inverter circuitry 1 is provided from the magnetosensitive device 40, and is amplified and rectified by an amplifier 41 and absolute value circuits 42 and 43 which rectify the output of the amplifier 41. The absolute value circuits 42 and 43 are provided for effecting a comparison in the same polarity as that of the output of the current level selector 8 and for quickening the detection of the output current. Although in the simplified arrangement of FIG. 6 only one phase is shown as being furnished to the detector, it is preferable to furnish two or three phases. The detection may also be implemented by sensing the current of the D.C. portion of the main inverter circuitry 1.

The first level setting 5 may comprise a variable resistor or the like.

The control circuitry 6 includes a frequency controller 61 which performs an acceleration or deceleration control in a predetermined time on the basis of the velocity command and the result of the comparison between the current values of the current level selector 8 and the current detector 4, a voltage/frequency setting unit 62 which receives the output of the controller 61 and delivers a voltage command on the basis of a predetermined voltage/frequency ratio, a PWM signal generator 63 which receives the outputs of the controller 61 and the setting unit 62 and delivers the PWM signals of the switching elements of the respective phases corresponding to their conditions, and a comparator 64 which compares the outputs of the current detector 4 and the level selector 8 and delivers the result of the comparison to the controller 61.

When the output of the current detector 4 is smaller than that of the selector 8, that is, when the output of the comparator 64 is at a low (L) level, the controller 61 regards the induction motor as being in the normal state and performs the acceleration or deceleration control in the predetermined time in response to the velocity command. The setting unit 62 delivers the predetermined voltage command in accordance with the output of the controller 61. The signal generator 63 produces and delivers the PWM signals in accordance with the commands of the controller 61 and the setting unit 62.

When the detection value of the current detector 4 is greater than the output level of the selector 8, that is, when the output of the comparator 64 is at a high (H) level, the controller 61 regards the induction motor as being in an abnormal state and performs the processing to decrease the present output frequency of the inverter or stop the increase thereof with preference taken over the velocity command, whereby the control apparatus controls the motor to suppress the increase of the slip.

The second level setting unit 7 includes a built-in function generator which provides a current level at a slip/stall torque corresponding to a voltage/frequency ratio. It provides the current level which corresponds to the voltage/frequency ratio signal supplied from the setting unit 62 of the control circuitry 6.

The level selector 8 comprises switches $SW_1$ and $SW_2$ which select the output of the first or second level setting units 5 and 7, and a comparator 81 and an inverter gate 82 which produce signals for controlling the switches. The switches $SW_1$ and $SW_2$ are each closed (but not together) when the applied control signal is "H", and opened when it is "L". When the output $L_1$ of the first setting unit 5 is smaller than the output $L_2$ of the second setting unit 7, the output of the comparator 81 goes to the "H" level, and the control signals for the switches $SW_1$ and $SW_2$ become $S_1=H$ and $S_2=L$, respectively, so that the output $L_1$ of the first setting unit 5 is delivered from the selector 8. When the relation of the magnitudes of the outputs $L_1$ and $L_2$ is converse, the selector 8 operates similarly to that described above with $SW_1$ and $SW_2$ being opened and closed, respectively. Accordingly, the smaller one of the outputs of the level setting units 5 and 7 is selected by and delivered from the selector 8 at all times.

Figure 7:
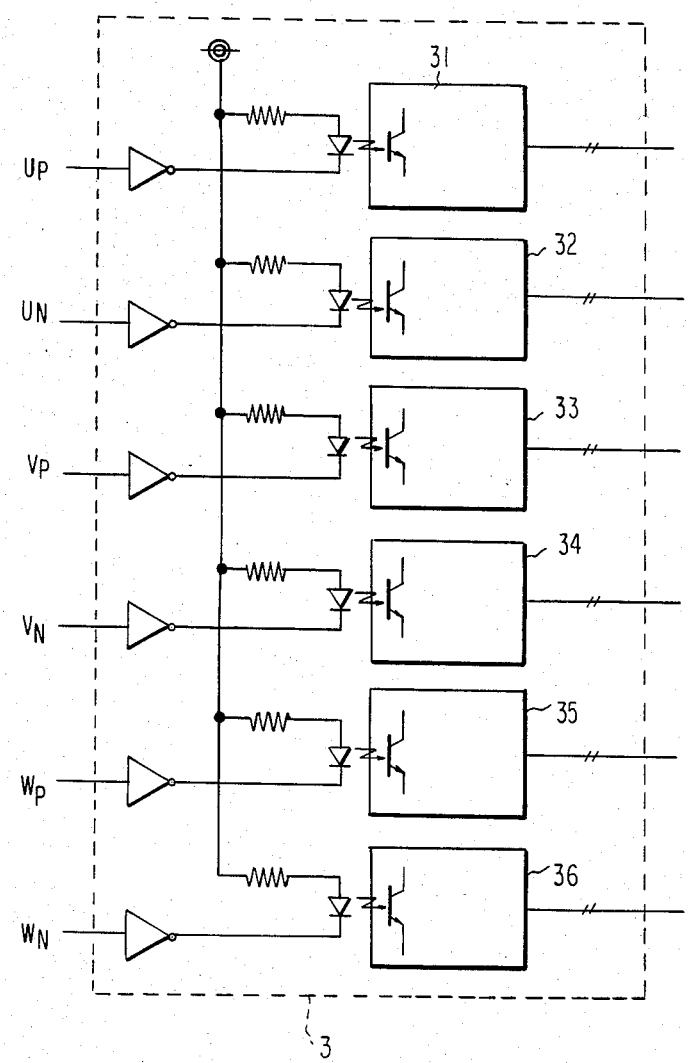
FIG. 7 is a circuit diagram showing the internal arrangement of drive circuitry.

FIG. 7 shows the drive circuitry 3. The output signals of the PWM signal generator 63 (FIG. 6) are insulatedly transmitted to driver circuits 31-36 through photocouplers or the like, whereupon the respective driver circuits 31-36 control the corresponding transistors of the inverter portion 12 (FIG. 2).

Figure 2:
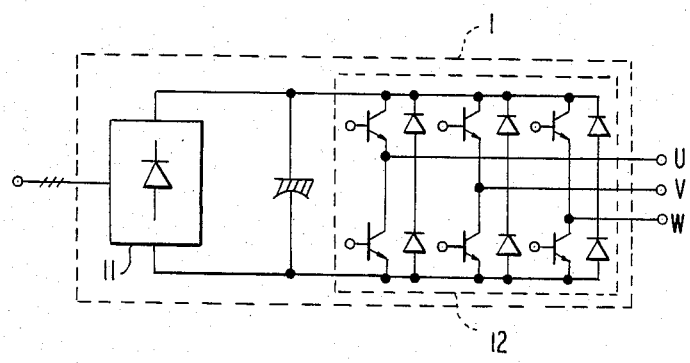
FIG. 2 is a simplified schematic diagram of the main inverter circuitry.
Figure 3:
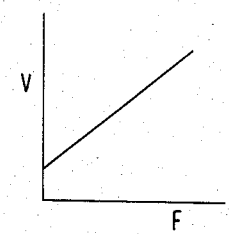
FIGS. 3(A), 3(B) and 3(C) are characteristic diagrams for explaining a method of controlling an induction motor on the basis of a voltage V/frequency F ratio.
Figure 3:
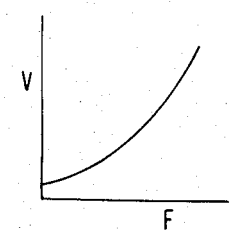
Figure 3:
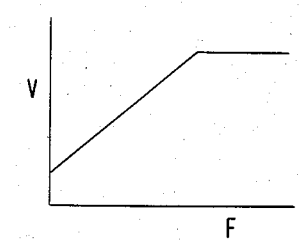

By way of modification a different inverter arrangement than that shown in FIG. 2 may be used, and although the current detection point has been taken on the inverter output side, it may be any point at which the output current and the current flowing through each element can be detected.

As set forth above, the present invention employs a first current level setting unit which sets a level for protecting circuit elements, and a second current level setting unit which sets a current that prevents a stall torque/slip point from being exceeded and which is determined in association with the load characteristic of an induction motor and a voltage/frequency ratio being presently delivered, and the smaller current level is selected to control the frequency to lower or to stop rising to prevent the slip frequency from being exceeded. Therefore, whatever voltage/frequency ratio is set to drive the motor or whatever induction motor is used, the motor can operate in a stable region without stalling or without damaging the inverter elements.

What is claimed is:

1. In a control apparatus for an inverter wherein an A.C. power source is subjected to variable-frequency and variable-voltage conversion to drive an induction motor at a variable-speed; an inverter control apparatus comprising: a first current level setting unit (5) for establishing a predetermined current level within a permissible limit of switching elements disposed in the inverter, a second current level setting unit (7) for establishing a current level at a slip value corresponding to a stall torque, in association with a characteristic of the loaded induction motor and an output voltage/output frequency ratio, a current level selector (8) for selecting the smallest one of the output signals of said first and second current level setting units, a current detector (4) for detecting the inverter output current, and control means (6) for controlling the switching elements in response to a velocity command, the output of the selected current level setting unit, and the detected inverter output current to render the inverter output current smaller than the selected current level signal.

2. An inverter control apparatus according to claim 1, wherein said second current level setting unit sets a current level in accordance with drive conditions characteristic of the induction motor being driven and the voltage/frequency ratio being delivered by said inverter.

3. An inverter control apparatus according to claim 2, wherein said control means supplies said second current level setting unit with a signal proportional to the voltage/frequency ratio being delivered by said inverter.

4. An inverter control apparatus according to claim 1, wherein the control circuit includes means (64) for comparing the outputs of said current level selector and said current detector, and means for generating on-off control signals for the switching elements of said inverter on the basis of the velocity command.

5. An inverter control apparatus according to claim 4, wherein said control circuit produces and delivers the on-off control signals for the switching elements on the basis of the velocity command such that said inverter delivers a voltage and a frequency corresponding to the command in accordance with a predetermined voltage/frequency ratio pattern.

6. An inverter control apparatus according to claim 4, wherein the control circuit includes means for producing the on-off control signals to decrease the output frequency of said inverter or stop its increase in accordance with a predetermined voltage/frequency pattern when the output value of said current detector becomes greater than that of said current level selector.

7. An inverter control apparatus according to claim 1, wherein said current detector detects current flowing between said inverter and the induction motor.

* * * * *